United States Patent [19]
Frederick

[11] Patent Number: 5,202,690
[45] Date of Patent: Apr. 13, 1993

[54] AUTOMATIC HORIZONTAL AND VERTICAL SCANNING RADAR

[76] Inventor: Philip R. Frederick, 632 17th Ave., Salt Lake City, Utah 84103

[21] Appl. No.: 892,158

[22] Filed: Jun. 2, 1992

[51] Int. Cl.$^5$ ............................................. G01S 13/00
[52] U.S. Cl. ...................................... 342/26; 342/180
[58] Field of Search ................. 342/26, 180, 140, 64

[56] References Cited

U.S. PATENT DOCUMENTS

| | | | |
|---|---|---|---|
| 3,044,058 | 7/1962 | Harris | 342/180 |
| 3,154,636 | 10/1964 | Schwertz | 342/180 |
| 4,940,987 | 7/1990 | Frederick | 342/26 |
| 5,049,886 | 9/1991 | Seitz et al. | 342/26 |

*Primary Examiner*—Mark Hellner
*Attorney, Agent, or Firm*—Thorpe North & Western

[57] ABSTRACT

A Weather radar and map display system for use in aircraft includes a transmitter for transmitting radar signals outwardly from the aircraft, a receiver for receiving back reflected radar signals, a digitizer for digitizing the reflected radar signals, a processor for calculating the latitude and longitude coordinates of the locations in space from which the reflected radar signals were reflected based on detected range information of the reflected radar signals and detected heading, position and track information of the aircraft, and a storage device for storing the digitized signals and the latitude and longitude coordinates calculated for respective reflected radar signals. Also included is a second storage device for storing predetermined map and navigation data, reference to latitude and longitude, of the ground over which the aircraft will travel, and a display device responsive to the first and second storage devices for simultaneously displaying a plan view image over a selected horizontal range of weather, represented by digitized reflected radar signals, relative to the calculated latitude and longitude coordinates, and of the map and navigational data relative to the latitude and longitude of that data. The weather display and map and navigational data display are superimposed over one another to enable quick and efficient location of weather conditions and map and navigational aids such as airports, navigational stations, and other aircraft guiding structure.

14 Claims, 3 Drawing Sheets

AUTOMATIC HORIZONTAL AND VERTICAL SCANNING RADAR

BACKGROUND OF THE INVENTION

This invention relates to a radar system for use especially with aircraft, and capable of automatic horizontal and vertical scanning and display of radar signals for presentation of a selectable vertical range for both a plan view and vertical view, and with the plan view display being with reference to latitude and longitude, if desired.

Conventional airborne weather radar systems display radar returns in a plan view only, representing weather images as the radar beam sweeps horizontally back and forth ahead of the aircraft, although a proposal for automatically displaying radar returns in both plan view and vertical view has been disclosed in U.S. Pat. No. 4,940,987. With the system of the patent, more information is available to the user since height, as well as horizontal extent, of weather conditions can be determined whereas, with the conventional systems, only the horizontal extent can be ascertained (at least automatically) Of course, knowing the height of a weather condition would enable the user of the system to determine whether flying above the condition were possible or whether flying around the system would be necessary.

Prior to the system of the afore-cited patent, determination of height of weather conditions had to be made by manually tilting the radar antenna up or down so that radar returns could be taken along sweeps at different elevations. Then, knowing the angle of elevation of the radar beam, the altitude of the aircraft, and the distance of certain echo returns, a trigonometric calculation or estimate could be made as to the height or elevation of weather conditions from which the echoes were reflected. Such manual tilting and elevation calculation, however, were time consuming, and a flight crew typically would not have the time to perform such operations, especially when flying in a stormy weather condition. Of course, with the system of the patent, such manual tilting and calculation is obviated.

Oftentimes during flight, the pilot will have no need for display of weather or other echo causing conditions much below the altitude of the aircraft, and yet such conditions may nevertheless be displayed on conventional weather radar systems (unless the pilot manually sets the radar antenna above a certain level). It would be desirable to eliminate such distracting echoes, such as ground clutter (echoes from terrain) which are sometimes not easy to distinguish from storms particularly in mountainous regions, to reduce the likelihood of pilot or navigator confusion.

Besides more accurate information on weather conditions now being available to pilots, so-called moving map displays have recently become available. With these displays, the positions of airports, navigational stations and airway intersections are provided in data bases for display in aircraft cockpits. Typically, symbols representing these positions are superimposed on weather radar displays as well as other display devices on the instrument panel. With real-time radar, such moving map displays are useful primarily when the aircraft course is constant and the aircraft speed is not great relative to the sweep cycle time of the radar antenna. However, when the aircraft turns or changes altitude, the display may be smeared until a new steady course is established. Further, with raster scanning radar systems, the overall scan cycle is much longer than with single sweep scan radars and thus the returns will be out of register relative to those of subsequent and prior cycles. In U.S. Pat. No. 5,049,886, a system is described which seeks to mitigate this problem by storing data referenced to the aircraft and then using heading and speed information to correct the display for aircraft motion. However, the system corrects the plan view only for translation and heading changes.

SUMMARY OF THE INVENTION

It is an object of the invention, in light of the above-described state of the art technology, to provide a new and improved automatic horizontal and vertical scanning radar system.

It is another object of the invention to provide such a system in which extraneous information such as ground clutter may be eliminated from a weather radar display.

It is a further object of the invention to provide such a system in which a user of the system may select the range of altitudes to be displayed on a plan view image presentation of the system.

It is an additional object of the invention to provide such a system in which the selected range of altitudes to be displayed in plan view may be symbolically indicated on a system display screen.

It is also an object of the invention to provide such a system in which radar returns may be stored and displayed relative to the earth's latitude and longitude.

Another object of the invention is to provide such a system in which the heading of the aircraft relative to latitude/longitude coordinates may be displayed on a system screen, and the latitude/longitude coordinates moved relative to the aircraft heading indication which remains fixed on the screen.

A further object of the invention is to provide such a system in which radar return information, may continue to be displayed on a system screen even though aircraft motion has excluded that region from active beam sweep.

The above and other objects of the invention are realized in a specific illustrative embodiment of an automatic horizontal and vertical scanning weather radar system which includes an antenna section for sweeping horizontally and vertically to obtain radar return signals which are digitized and then stored in three-dimensional memory. The locations in memory at which the return signals are stored represent the locations in space (volume elements or voxels) from which the corresponding return signals were received. A display device receives digitized signals representing reflected radar signals and produces a plan view image display of weather over a preselected horizontal and vertical range, and a vertical view image display of weather over a preselected range. A control device or processor supplies horizontal drive signals and vertical drive signals to the antenna section to control movement of the antenna, and retrieves selected digitized signals stored in the three-dimensional memory, as specified by plan view altitude range (pvar) signals, and supplies the retrieved digitized signals to the display device. A manually operable pvar signal generator allows the system user to selectively supply pvar signals to the control device to define a uniform vertical rang of the plan view image displayed and a vertical view image displayed, so that radar return signals outside the selected vertical range, such as might be caused by ground clutter, are eliminated from display.

In accordance with one aspect of the invention, vertical range symbols, indicating the height of the plan view and vertical view images of weather being displayed, are displayed on the display device adjacent the vertical view image.

In accordance with another aspect of the invention, means are provided for developing latitude and longitude (and altitude if desired) addresses for each voxel covered by the radar sweeps. In conjunction with the address data developing means, the control device controls the storage of digitized radar return signals in the three dimensional memory so that they are stored at along with their respective voxel addresses. The display means responds to the stored data and digitized signals by displaying the plan view image of weather superimposed over a latitude and longitude display where such weather image is located. In this manner, radar return signals of weather conditions are displayed relative to latitude and longitude.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
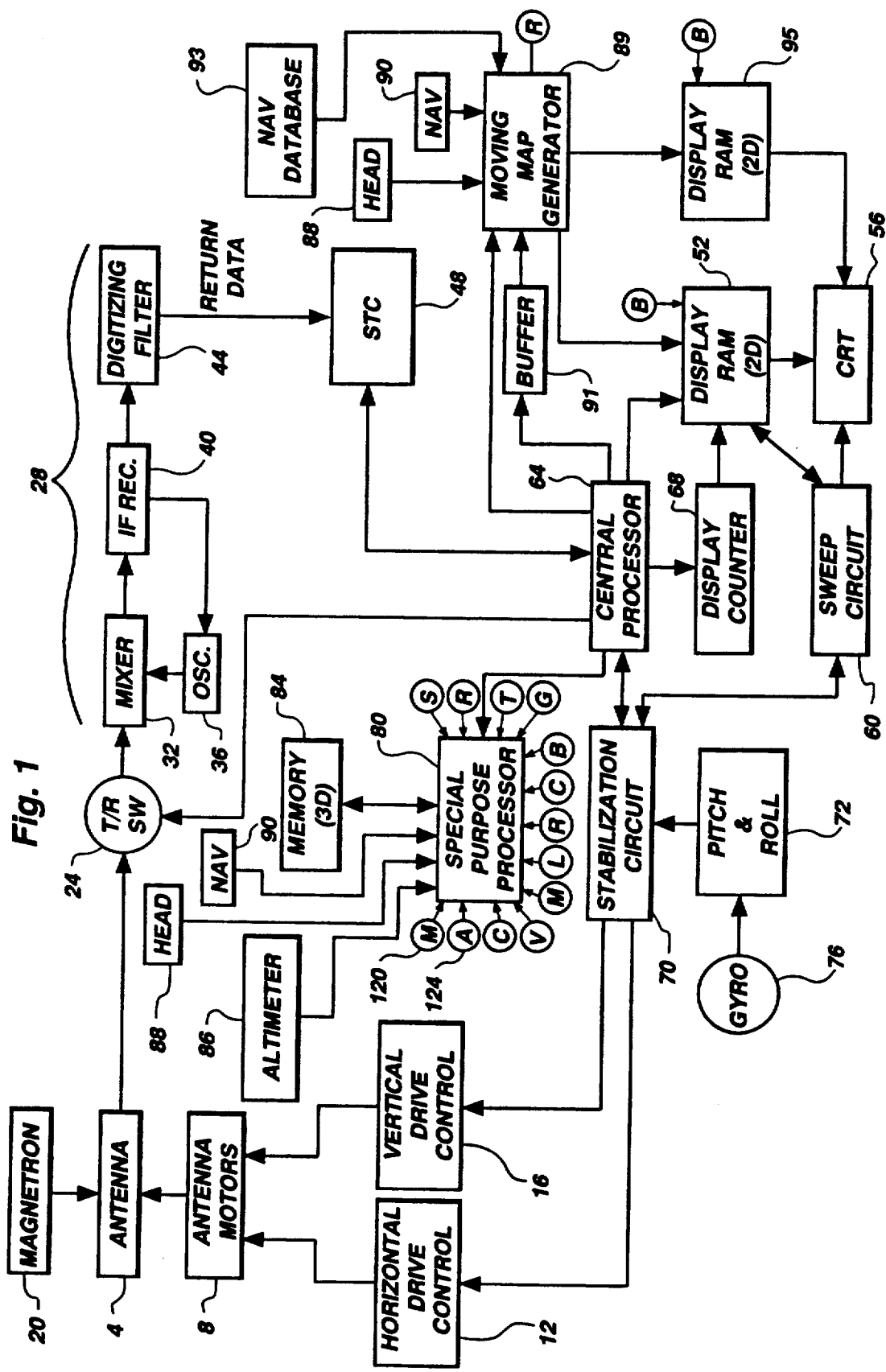
FIG. 1 shows a block diagram of the airborne weather radar system made in accordance with the principles of the present invention.

Referring to FIG. 1, there is shown a block diagram of a specific illustrative embodiment of the present invention of an automatic horizontal and vertical scanning weather radar system for aircraft. The system includes a conventional radar antenna 4 such as a phased array flat plate antenna with fixed frontal gain pattern, all of which is standard. The antenna 4 is mounted, again in a conventional manner, to oscillate back and forth and direct a beam horizontally outwardly, and also to move up and down to direct a beam vertically outwardly.

Antenna stepper motors 8 are coupled to the antenna 4 to move and position the antenna in conventional x and y directions of an orthogonal coordinate system. Stepper signals directing the antenna motors 8 to move the antenna 4 in a programmable preselected pattern are supplied by a horizontal drive control circuit 12 and a vertical drive control circuit 16. The horizontal drive control circuit 12 provides the stepper signals to cause the antenna 4 to be moved in the horizontal direction while the vertical drive control circuit 16 supplies the stepper signals to cause the antenna 4 to be moved in the vertical direction. In combination, the two drive control circuits 12 and 16 completely determine the pattern and speed at which the antenna 4 is moved. Exemplary patterns of movement of the antenna 4 are shown in U.S. Pat. No. 4,940,987, which is incorporated herein by reference. It should also be noted that the horizontal drive control circuit 12 and vertical drive control circuit 16 respond to signals from a stabilization circuit 70 (to be discussed later) for correcting the position of the antenna 4 to compensate for pitch and roll of the aircraft.

A standard microwave generator, such as a magnetron 20, supplies transmit signals to the antenna 4 to cause it to produce the radar signals (consisting of narrow pulses of a high-frequency wave) The antenna 4 is used both for transmitting radar signals and for receiving reflected radar signals. A transmit/receive switch 24 is provided to allow the flow of electrical signals from the antenna to receiver circuitry 28 when the antenna is in the receive phase, but to block the flow of such electrical signals when the antenna is in the transmit phase. This protects the receiver circuitry 28 from transmission energy that might otherwise flow to the receiver circuitry causing damage.

The receiver circuitry 28 includes a mixer 32 which converts the high frequency return signals to lower frequency signals suitable for processing. A local oscillator 36 supplies an oscillatory signal of a certain frequency to the mixer 32 which produces an intermediate frequency (IF) signal from the oscillator signal and the incoming return signals. The frequency of the oscillator signal is adjusted by an IF receiver 40 to maintain the desired frequency of the IF signal. The IF receiver 40 amplifies the IF signal received from the mixer 32 and supplies the amplified signal to a digitizing filter 44. The digitizing filter 44 converts the received analog signal into a digital signal, typically two or three bits in length, and filters the digital signal for transfer to the next stage of the system.

A digital STC (Sensitivity Time Control) correction processor and logic unit 48 is a conventional circuit package for receiving digital return data from the digitizing filter 44 and adjusting the intensity of the data to compensate for differing distances from which the radar return data is received (since near return data is more intense than for distant return data). This is a well-known process. The compensated data, including distance information, is then supplied to a central processor 64 which, in turn, supplies it to a special purpose processor 80 for storage in a three-dimensional random access memory 84.

The central processor (conventional microprocessor) 64 controls and coordinates the operations of the other circuits and units of the radar system of FIG. 1, including a display RAM 52, a display counter 68, and a stabilization circuit 70. The display RAM 52 is a two-dimensional random access memory in which the central processor 64 stores the picture image data (prepared by the special purpose processor 80 as will be discussed momentarily) to be displayed on a cathode ray tube (CRT) 56. This data is supplied to a sweep circuit 60 which, in response to the data, produces scan signals for application to the CRT 56. Return data is supplied to the display RAM 52 to addresses determined by the special purpose processor 80 and identified and conditioned for storage by the display counter 68. The display counter 68 also addresses the display RAM 52 to refresh the CRT 56 and generates the horizontal and vertical retrace trigger signals. Again, such display procedure is known in the radar and video display system art.

The stabilization circuit 70 comprises a microprocessor-based sub-system which monitors signals from a pitch and roll circuit 72 coupled to a conventional gyroscope 76, and supplies control signals to the horizontal and vertical drive control units 12 and 16. These units, in turn, generate compensating stepper signals for positioning the antenna 4 to account for an irregular movement of the aircraft, which movement would be detected by the gyroscope 76. The control units 12 and 16, as earlier indicated, control the initial positioning and subsequent movement (and speed of movement) of the antenna 4, all under control of the central processor 64. The stabilization circuit 70, pitch and roll circuit 72 and gyroscope 76 are of conventional design and operation.

The special purpose processor 80 is programmed to receive and store in the three-dimensional memory 84 all digital radar return data, including distance information, obtained from the antenna 4 sweeping horizontally in the different sweep planes (different antenna tilt angles). As return data is received and digitized from each sweep plane, it is supplied by the central processor 64 to the special purpose processor 80 which updates the old data for the sweep plane in the memory 84. The memory 84 includes a three-dimensional array of addresses, each for storing data representing a different voxel (volume element) in space from which the corresponding radar return data was received. The location of the voxel in space and thus the address in the memory 84 for storing data representing the voxel is determined from distance information and antenna 4 position.

From the stored radar data, the special purpose processor 80 constructs the two-dimensional display data to be stored in the two-dimensional display RAM 52 and ultimately displayed on the cathode ray tube 56. This two-dimensional display includes a horizontal, plan view image along with either a vertical front view image or a vertical side view image of the weather condition being scanned. Advantageously, the vertical front view (if the vertical front view is the vertical view to be shown) is positioned above the horizontal, plan view, on the display (cathode ray tube 56), as illustrated in FIG. 2 at 104 and 108 respectively.

The manner of retrieving and formatting the data to be displayed, and of selecting the thickness of the "slices" of radar returns to be displayed using the cursor control dual knob 136 is fully discussed in the U.S. Pat. No. 4,940,987 patent.

Figure 2:
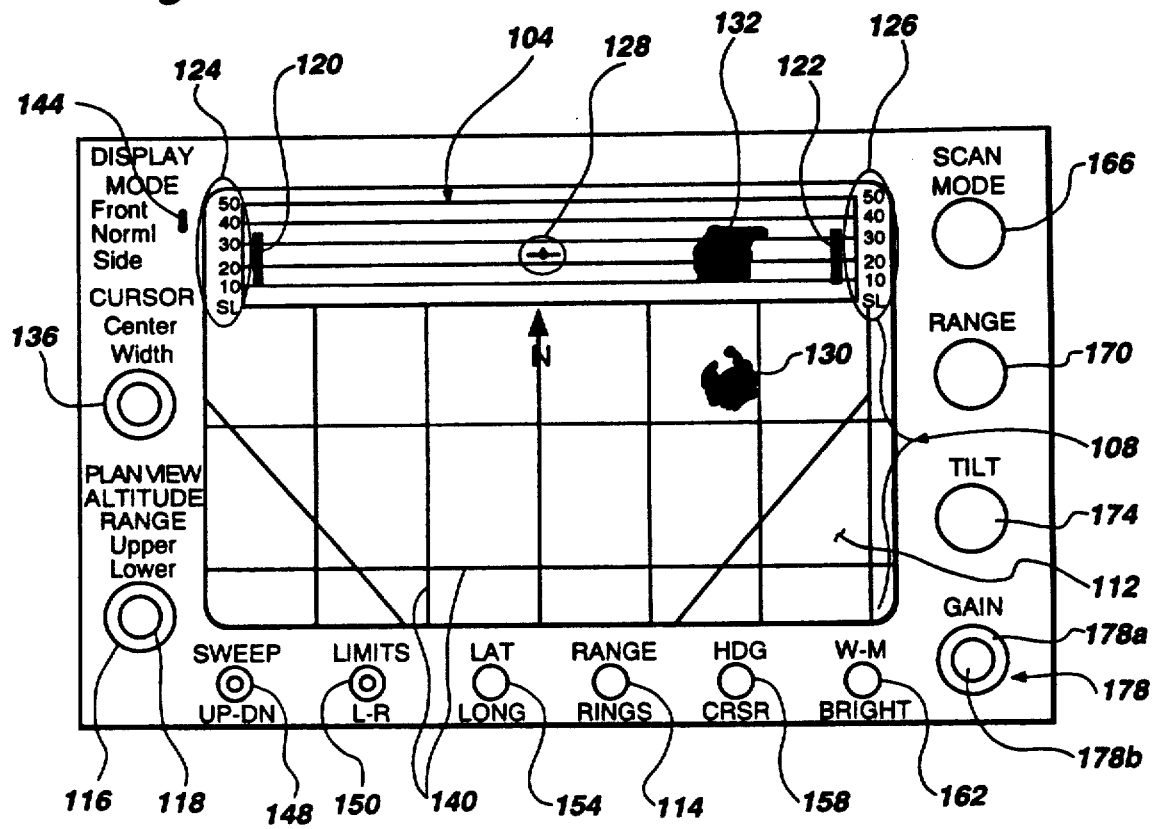
FIG. 2 shows a front view of a cathode ray tube display made in accordance with the principles of the present invention.

FIG. 2 is a front view representation of the cathode ray tube 56 showing a display area screen 112 on which the radar images are displayed. As already indicated, a horizontal plan view image is shown displayed at 108 and a vertical front view image is shown displayed at 104. With these displays, a pilot flying towards a weather condition can determine the range or distance of the condition (from the plan view image 108 and distance or range indicia [which can be displayed by operating push button 114] produced by the cathode ray tube 36 from stored distance information) and the altitude of the condition (from the vertical front view image 104 and altitude indicia 124 and 126 produced on the screen from stored altitude information [to be discussed momentarily]). This would facilitate selection by the pilot of the best route through the weather condition to avoid individual storm cells—since the weather is displayed so that the pilot can perceive at a glance, heights as well as intensities of storm cells.

Figure 3:
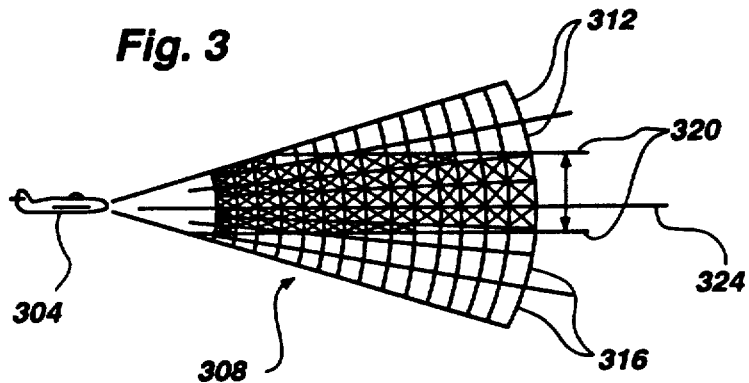
FIG. 3 is a graphic representation of a vertical range of radar returns which may be selectively displayed in accordance with the present invention.

Plan view images typically displayed on conventional radar systems oftentimes include the display of echoes or radar returns received from objects below the altitude of interest to the pilot, such as terrain, especially mountainous terrain, and low level clouds. Since these returns are not necessary for proper navigation of the aircraft, their display serves only as a source of confusion to the pilot. In order to eliminate such returns, the system of FIG. 1 allows for selection of a desired plan view altitude range (pvar) in which the plan view to be displayed will be derived only from returns falling within the selected vertical or altitude range. Such a range is illustrated in FIG. 3 which shows an aircraft 304 sending out a radar beam 308 which sweeps both horizontally (not shown) and vertically (indicated by the stacked planes 312). As described in the afore-cited U.S. Pat. No. 4,940,987 patent, the memory 84 (FIG. 1) stores radar data of all sweeps of the antenna through all of the vertically stacked planes 312 so that data representing the weather conditions inside the entire volume of the scanned region are stored. Some of such data may include returns from the lower planes, e.g., planes labeled 316 (FIG. 3), resulting from terrain (ground clutter) which are undesired. Rather, it may be desirable simply to display in the plan view image, data returns existing in an altitude or vertical range shown between parallel lines 320 (or the data returns above the lower of the parallel lines 330), which is in the range where the aircraft 304 is likely to fly. The return data stored in memory 84 which falls within such altitude range can be readily determined using trigonometric calculations. Specifically, the height of any voxel in the range between parallel lines 320 can be determined with respect to a horizontal plane 324 in which the aircraft 304 is flying, from the equation $$V = (\sin \theta)(D),$$

where V is the distance of the voxel in question above or below the plane 324, $\theta$ is the angle upward or downward from the plane 324 at which the antenna is tilted to produce the return voxel in question, and D is the distance from the aircraft 304 to the voxel in question. Since the distance of each radar return and the angle of the antenna from the horizontal are known, whether or not a voxel is within the altitude range between lines 320 of FIG. 3, can be readily determined.

The pilot selects the plan view altitude range (pvar) which he desires to be displayed, by operating knobs 116 and 118 on the display panel of FIG. 2. For example, knob 116 could be used to set the upper limit of the desired altitude range and knob 118 could be used to set the lower limit. The special purpose processor 80 (FIG. 1) responds to the settings by causing development on the display screen 112 (FIG. 2) vertical elongate bars 120 and 122 which indicate the altitude or vertical range desired. The upper ends of the bars 120 and 122 would indicate the upper limit of the desired altitude range (if an upper limit were desired) and the lower ends of the bars would indicate the lower limit. The bars 120 and 122 are set out adjacent to altitude range indicia 124 and 126 respectively, which indicia are produced on the screen 112 in accordance with conventional methods. An aircraft symbol 128 is also produced on the screen 112 to provide the pilot with an indication as to the altitude of the aircraft relative to the indicia 124 and 126 and also relative to the altitude range bars 120 and 122. The bars 120 and 122 and the aircraft symbol 128 are all developed on the vertical view image section 104 of the display screen 112.

Once the desired altitude range for plan view display (and also vertical view display) are set by knobs 116 and 118, the special purpose processor 80 (FIG. makes the calculation of which voxels of data fall within the range and then retrieves those voxels from memory 84 and supplies them via the central processor 64 to the display ram 52 for display on the cathode ray tube 56. Alternatively, the special purpose processor 80 could calculate which voxels fall within the selected altitude range before storage in the memory 84, and then store only those returns which fall within the range so that the only voxels available for retrieval from the memory are those which fall within the range.

An exemplary weather condition is shown in the plan view image portion 108 of the display at 130 and in the vertical view image portion 104 of the display at 132. Note that the weather condition 132 displayed in the vertical view image portion of the display 104 does not extend above the altitude range bars 120 nor below the bars. This, of course, simply illustrates that only the selected vertical or altitude range of radar returns is being displayed both in the vertical view image and the plan view image. Thus, any returns either above or below that range are not being displayed so that the pilot is not provided with unnecessary and possibly confusing radar returns.

In order to develop the altitude range bars 120 and 122 and the aircraft symbol 128 on the display 112 of FIG. 2, the system of FIG. 1 includes provision for receiving the output from an encoding altimeter 86 for determining the altitude of the aircraft (above sea level) carrying the radar system. The altimeter provides readings of the altitude of the aircraft and supplies those readings to the special purpose processor 80 which, in turn, stores the readings and produces for display data representing the altitude range bars 120 and 122 and the image of the aircraft 128, as well as actual elevation of the weather pattern to be displayed in the vertical view. These images are displayed automatically from altitude information received from the altimeter 86 and this enables the pilot to readily determine his elevation relative to weather condition into which he is flying as well as the vertical extent of the weather condition above sea level.

Another feature of the invention which enables the pilot to more accurately determine troublesome weather conditions with respect to his aircraft involves the use of moving map display technology which has become popular in recent years for enabling a pilot to identify the positions of airports, navigational stations, airway intersections, and the like relative to the aircraft. See U.S. Pat. No. 5,057,835. The feature of the present invention adapts the moving map concept to provide for displaying weather conditions relative to latitude and longitude so that the pilot may view the location of weather conditions relative to the terrain below (whether or not such weather conditions are directly in front of the aircraft). This feature is implemented by providing the system of FIG. 1 with a compass system 88 (shown in two places in FIG. 1) for determining the heading of the aircraft (direction of the long or roll axis of the aircraft). The information as to the aircraft heading is fed to the special purpose computer 80 on a continuous basis and also to a moving map generator 89 (to be discussed later). Also provided is a navigation system 90 (also shown in two placed in FIG. 1) such as LO-RAN, INS (inertial navigation system), VLNF (very low frequency navigation system), or GPS (global positioning satellite system) for determining the position of the aircraft and the track of the aircraft relative to the earth. Any one of the named systems could be used. This information likewise is supplied to the special purpose processor 80 on a continuous basis and also to the moving map generator 89. Both the compass system 88 and the navigation system 90 are well known systems used in the aircraft industry.

With the heading information H, aircraft position information P, and track information T, available from the compass system 88 and navigation system 90, along with the range R of a radar echo or return (distance from the aircraft) and the horizontal deflection of the antenna A (negative to the left of the long axis of the aircraft and positive to the right) which are determinable from time of return of a radar echo and position of the antenna, respectively, the latitude and longitude of the position E of a radar echo can be calculated by the special purpose processor 80 utilizing rhumbline trigonometry. One other parameter is necessary for this calculation, that being the so-called crab angle C which is the angle of the heading to the left ($-$) or right ($+$) of the track which results in that track; if there is no crosswind component, the crab angle C and track T are the same. The crab angle C can be calculated from the heading information and the track T. The formulae for calculating the latitude and longitude of each weather echo position E are as follows:

Latitude $E=$Latitude $P+\cos{(T+A-C)}/60$

Longitude $E=$Longitude $S-[(\tan{(T+A-C)}) *180$ (ln tan $(45+0.5$ Latitude E$)-$ln tan $(45+0.5$ Latitude P$))]/$pi.

As the echo returns are received, calculations are rapidly made by the special purpose processor 80 to determine the latitude and longitude (and altitude) addresses of the returns, and these addresses are stored, along with the respective returns, in the memory 84. When this information is retrieved from the memory 84 by the special purpose processor 80 and supplied to the central processor 64, and then to a buffer 91, the information is formatted to display the weather echo returns relative to latitude and longitude. Of course the latitude and longitude covered by the display (the relative extent of which is chosen and entered into the central processor 64 by the user) is continually changed as the aircraft moves.

The special processor 80 is programmed to develop optional display of latitude and longitude coordinate lines 140 to cover a predetermined area in front of, to the side of, and to a certain extent behind the aircraft, and this information is also supplied to the central processor 64 and then the buffer 91. The weather condition 132 is shown in the plan view display 108 positioned relative to latitude and longitude grid lines 140, which position would be calculated as previously described.

As previously indicated, the central processor 64 stores in the buffer 91 the data to be displayed in plan view, along with corresponding latitude and longitude addresses for the data, and also the data to be displayed in vertical view. The plan view data will include a selected latitude "thickness" of radar return signals to be displayed and the vertical view data will include a selected horizontal "thickness" of radar return signals to be displayed. In other words, the plan view image will be composed of all echoes having latitude and longitude addresses within the selected altitude range, and the vertical view image will be composed of all the echoes having the latitude and longitude addresses within the selected horizontal range. The data in the buffer 91, representing data showing the weather, will be combined with so-called moving map data (of the location of airports, navigational stations, etc.) developed by a moving map generator 89.

The moving map generator 89 receives heading information H, aircraft position information P, and track information T from the compass system 88 and navigation system 90, just as does the special purpose processor scanner 80. The moving map generator 89 also has access to and selectively retrieves information from a navigational data base 93 containing latitude and longitude addresses of navigation stations, airports, way points, etc. within the general area over which the aircraft is expected to fly. The moving map generator 89, in particular, retrieves such latitude and longitude addresses from the data base 93 within the particular range of distance from the aircraft which is selected for display at a given time. This range is selected by the pilot by setting control knob 170 (to be discussed later) and this setting information is supplied to both the special purpose processor 80 and the moving map generator 89, so both will develop their display data over the same latitude/longitude range. From all of this information, the moving map generator 89 constructs or generates a map of the navigation stations, airports, way points, etc. positioned relative to latitude and longitude, of the area over which the aircraft is flying. This data is converted by the moving map generator to x, y coordinates for video display and supplied to a second display RAM 95. Alternately, the moving map generator 89 retrieves echo return data from the buffer 91, converts it to x,y coordinates for display and supplies it to the display RAM 52, again for the same horizontal (latitude and longitude) range as covered by the map data in the display RAM 95. The data from the display RAM 52 (containing echo return information) and the display RAM 95 (containing navigation and map data) are alternately supplied as video outputs to produce on the cathode ray tube 56 a plan view image showing weather conditions superimposed over navigation and map information, all displayed in terms of the latitude and longitude location of the weather conditions and navigation and map information. The central processor 64 supplies a synchronization signal to the moving map generator 89 as new data is supplied to the buffer 91, and in this manner, the moving map generator 89 can synchronize and coordinate the supply of data to the display RAMS 52 and 95 and the display of such information on the cathode ray tube 56.

The moving map generator 89 and navigational data base 93 are conventional systems for developing moving map displays, similar to the system and displays disclosed in the previously cited U.S. Pat. No. 5,057,835.

Figure 4:
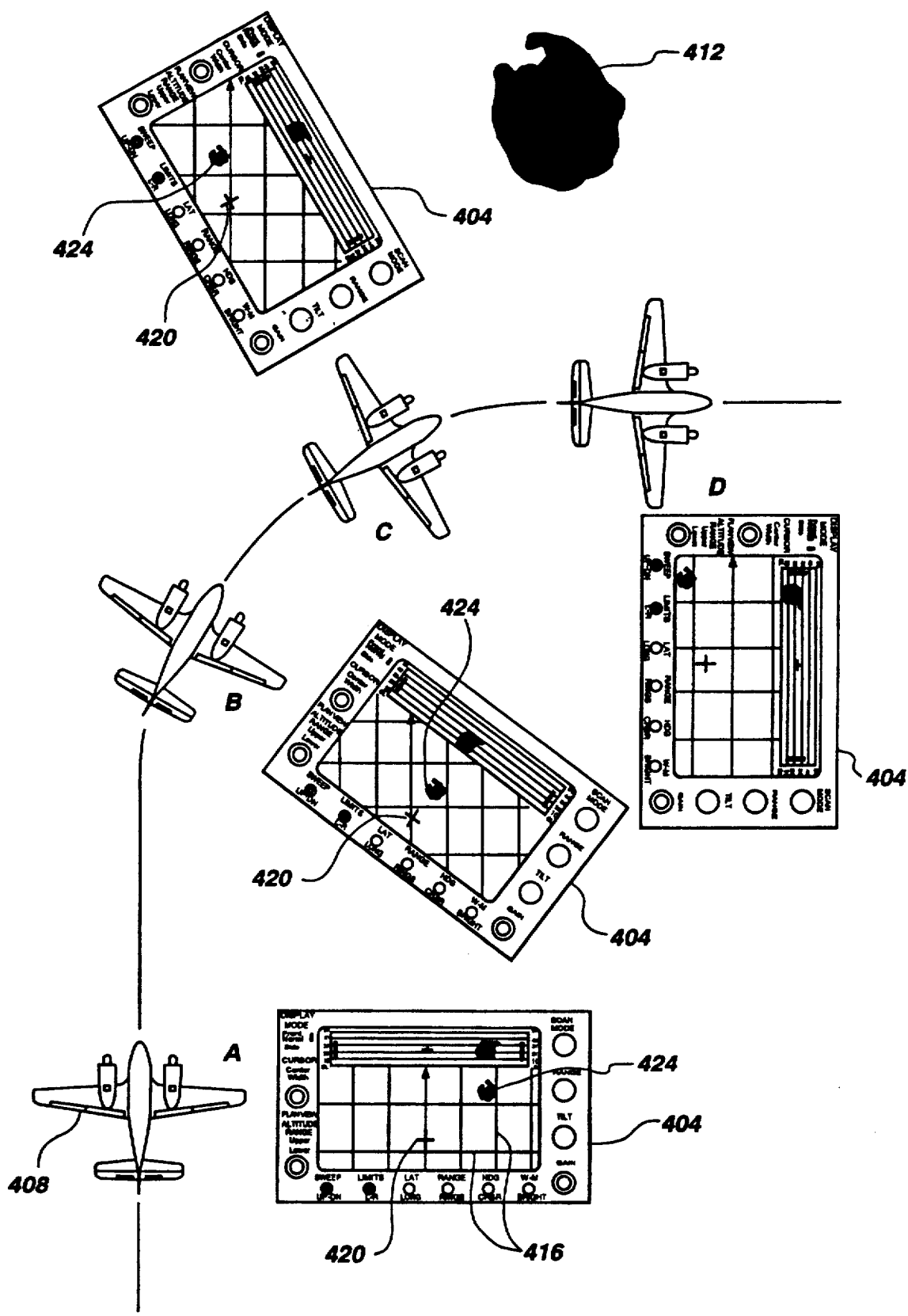
FIG. 4 graphically illustrates successive positions of an aircraft and the display of weather conditions relative to latitude and longitude coordinates on the aircraft's weather radar display screen, in accordance with the present invention.

FIG. 4 shows exemplary displays on a display screen 404 of an aircraft 408 as the aircraft makes a turn relative to a weather condition 412. In position A of the aircraft 408, the aircraft is shown heading north and the weather condition 412 is at about the one o'clock position and is shown on the display to be to the right of the course heading. Latitude and longitude coordinates 416 are shown on the display, but need not be provided if the pilot so desired (to avoid cluttering the display screen with more information than perhaps was needed). At position B, the aircraft has turned slightly to the right and is headed generally towards the weather condition 412, and this is shown on the screen with the aircraft symbol 420 shown heading towards the weather condition symbol 424. Note that in position B, latitude and longitude grid lines 416 remain positioned north and south and east and west, i.e., stationary relative to the earth, but appear to be rotated counter-clockwise to the pilot viewing the screen. Also, in position B, the weather condition symbol 424 is now moved downwardly and is nearly in the center of the display rather than near the upper right hand margin as it was in position A.

In position C, the aircraft has nearly completed its turn in front of the weather condition 412 so that the weather condition symbol 424 appears on the screen 404 at about the ten o'clock position relative to the aircraft. Finally, in position D, the aircraft has established a new heading toward the east and is beyond the weather condition 412. The weather condition symbol 424, nevertheless, is still visible at the lower margin of the display 404, slightly behind the aircraft so that the pilot still has an indication of the location of the weather condition even though it is no longer in front of the aircraft.

It should be noted that the ninety degree turn of the aircraft might take, for example, thirty seconds with a rate of about three degrees turn per second, and the raster sweep cycle might require two minutes. But, even with this, there would be no smearing or misregistration of the images because the weather condition is displayed relative to latitude and longitude rather than the currently used real-time display of weather returns. It should also be noted that the vertical display also shifts appropriately across the screen as the aircraft turns, made possible because its loci are based on latitude and longitude.

Although the display of weather indicated in FIG. 4 is of the track or heading shown upwardly on the display screen and the latitude and longitude coordinates remaining fixed relative to the ground (but indicated as rotating on the screen), the system of FIG. 1 could also provide for maintaining the latitude and longitude coordinates fixed relative to the screen (and rotating relative to the ground) with the aircraft symbol being rotatable on the screen to show the position and heading of the aircraft relative to fixed latitude and longitude coordinates. This alternative would be less frequently used since conventional weather display systems produce the displays with the aircraft track pointing upwardly on the screen since the vertical display would be disabled in a non "track-up" mode.

The system of FIG. 1 also includes a number of manual controls (three of which have already been discussed) to enable selection of the data to be displayed on the cathode ray tube 56. These controls include the display mode control 144, sweep limit controls 148 and 150, a latitude and longitude coordinate push button 154, a heading cursor button 158, a scan mode control 166, a range control 170, a tilt angle control 174 and a gain control 148. These controls, in the form of rotatable knobs or buttons, are located on the display unit 56 (FIG. 1) although the information and control signals developed by the controls are supplied to the special purpose processor 80.

The display mode control 144 (FIG. 2) allows the pilot to select any one of three images or combination of images to be displayed. When the control knob or switch 144 is in the "normal" position, then the special purpose processor 80 is signalled to display the normal horizontal, plan view image of the weather condition, taking up the entire screen 112. When the display mode control 144 is in the "front" position, then the special purpose processor is signalled to display both the horizontal, plan view image and the vertical, front view image, as illustrated in FIG. 2. When the display mode control 144 is in the "side" position, then the images displayed are the horizontal, plan view and the vertical, side view. Of course, other display modes with different combinations of views could be provided if desired.

The sweep limit controls 148 and 150, when set, limit the sweep of the antenna in the vertical and horizontal directions respectively. These controls allow the pilot to narrow and focus on the area from which radar returns are to be received and this, of course, allows for more frequent updating since the sweep cycle time is reduced if the sweep limits are reduced.

The latitude/longitude button 154, when depressed, signals the special purpose processor 80 to provide latitude and longitude grid lines for display on the display screen 112. A subsequent push of the latitude/longitude button 154 causes removal of the latitude and longitude grid lines from the display.

The heading cursor push button 158 is a standard on/off feature of conventional radars and serves to cause the radar system to produce a course heading line on the screen to illustrate a heading for the aircraft which, for example, could be used to help select a course for the aircraft to avoid the weather condition.

The controls 162, 166, 170, 174 and 178 are all standard features of a conventional aircraft radar system. Control 162 is for controlling the brightness of displayed weather conditions and moving map display information independently relative to the overall display brightness. By manual control, inputs are supplied to the display RAM 52 and display RAM 95 to respectively control the brightness of weather conditions and moving map display information. Control 166 allows the pilot to select the scan mode for the cathode ray tube 156, i.e., stand-by, test, weather (the mode of interest here) or terrain mapping (antenna 4 tilted downwardly to obtain image of the terrain below). Control 170 is used to select the range (distance ahead) to be displayed in the top plan view display 108. Long distances, such as two hundred miles, may be selected to supply a general, non-detailed view of major storms ahead, or shorter distances, such as thirty or forty miles, may be chosen to give a more detailed view of a storm. As indicated earlier, the setting of control 170 establishes the latitude/longitude area for display of both weather data and moving map data. Control 174 allows for manually positioning the tilt of the antenna 4 when control 144 is in the "normal" scan mode. Finally, control 178 (which consists of two knobs 178a and 178b) is an amplifier gain control function and a brightness/intensity control function of the images displayed on the screen 112.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. An automatic horizontal and vertical scanning weather radar system for an aircraft comprising antenna means mounted in the aircraft for receiving reflected radar signals and responsive to a transmit signal for producing and directing outwardly therefrom a radar beam, and responsive both to horizontal drive signals for sweeping the radar beam back and forth horizontally, and to vertical drive signals for moving the radar beam up and down vertically, means for periodically supplying transmit signals to the antenna means, receiver means coupled to the antenna means for digitizing reflected radar signals received by the antenna means, means for storing the digitized signals in a three-dimensional array representing voxels in three-dimensional space transversed by the radar signals, display means responsive to the digitized signals for displaying both a plan view image of weather over a preselected horizontal range represented by reflected radar signals received by the antenna means sweeping back and forth horizontally, and a vertical view image of weather for a preselected height range represented by reflected radar signals received by the antenna means moving up and down vertically, means for supplying horizontal drive signals and vertical drive signals to the antenna means, control means for selectively retrieving from the storing means digitized signals specified by plan view altitude range (pvar) signals and supplying the retrieved digitized signals to the display means, and manually operable pvar signal generating means for selectively supplying pvar signals to the control means to define a uniform vertical range of the plan view image displayed, and the vertical view image displayed.

2. A system as in claim 1 wherein said control means includes means responsive to the pvar signals for developing digitized vertical range signals representing the preselected height range of the vertical and horizontal view image of weather displayed, and for supplying the digitized vertical range signals to the display means, and wherein said display means is adapted to display one or more vertical range symbols, in response to the digitized vertical range signals, indicating the height of the vertical and horizontal view image of weather being displayed.

3. A system as in claim 2 wherein said vertical range symbols comprise vertically positioned bars whose length represents the height of the vertical view image of weather being displayed and the range of heights displayed in the plan view.

4. A system as in claim 3 wherein said display means comprises a display screen, and means for displaying on the screen in a first area the plan view image, and in a second area the vertical view image, and wherein said means for displaying is adapted to display said vertically positioned bars at each side of the second area of the screen.

5. A system as in claim 1 further including means for developing latitude and longitude coordinate data for the preselected horizontal range, first means for supplying the coordinate data to the storing means, second means for supplying the digitized signals to the storing means for storing at locations containing coordinate data corresponding to the latitude and longitude from which respective digitized reflected radar signals were returned, and wherein said display means includes means responsive to the coordinate data and digitized signals for displaying the plan view image of weather relative to latitude and longitude coordinates.

6. A system as in claim 5 wherein said display means includes means responsive to the latitude and longitude coordinate data for displaying a first plurality of spaced-apart parallel lines representing latitude coordinates and a second plurality of spaced-apart lines, positioned to intersect the first plurality of lines at right angles, representing longitude coordinates.

7. A system as in claim 6 further including means for developing heading data identifying the heading of the aircraft relative to latitude and longitude coordinates, and for supplying the heading data to the display means, and wherein said display means is adapted to display an aircraft symbol showing the heading of the aircraft relative to the latitude and longitude coordinate lines being displayed.

8. A system as in claim 7 wherein the latitude and longitude coordinate lines are displayed as horizontal and vertical, non-rotatable loci, and wherein the aircraft symbol is rotated relative to the latitude and longitude coordinate lines as the heading of the aircraft changes, to thereby show the heading of the aircraft relative to the latitude and longitude coordinate lines 9. A system as in claim 7 wherein the aircraft symbol is displayed in fixed position, and the latitude and longitude coordinate lines are rotated relative to the aircraft symbol as the heading of the aircraft changes, to thereby show the heading of the aircraft relative to the latitude and longitude coordinate lines.

10. A weather radar system for aircraft comprising antenna means mounted in the aircraft for transmitting radar signals outwardly from the aircraft and receiving back reflected radar signals, and for producing horizontal deflection signals indicating the horizontal deflection A from the center line of the aircraft from which reflected radar signals are received, receiver means coupled to the antenna means for digitizing reflected radar signals received by the antenna means, and for producing range signals representing distances R from the aircraft from which reflected radar signals are received, heading means for producing heading signals indicative of the heading H of the aircraft relative to the latitude and longitude of the earth, navigation means for producing position signals and track signals indicative, respectively, of the position P of the aircraft and the track T followed by the aircraft relative to latitude and longitude of the earth, means for storing the digitized signals, horizontal deflection signals, range signals, heading signals, position signals track signals, display means responsive to display control signals for displaying a plan view image of weather over a preselected area ahead and to the side of the aircraft, represented by received reflected radar signals, relative to latitude and longitude of the earth, and control means for producing display control signals from the stored digitized signals, horizontal deflection signals, range signals, heading signals, position signals and track signals.

11. A system as in claim 10 further including altitude means for producing altitude signals indicative of the altitude of the aircraft above sea level, means for storing the altitude signals, wherein said display means includes means responsive to further display control signals for displaying a vertical view image of weather for a preselected height represented by received reflected radar signals, and altitude indicia indicating the altitude of the vertical view image of weather above sea level, and wherein said control means includes means for producing further display control signals from the stored digitized signals, range signals, and altitude signals.

12. A system as in claim 10 wherein said storing means includes processor means for developing a signal representing the crab angle C between the heading H and track T, and for developing the latitude and longitude position E for each reflected radar signal as follows:

Latitude $E =$ Latitude $P + \cos(T+A-C)/60$

Longitude $E =$ Longitude $S - [(\tan(T+A-C)) * 180 (\ln\tan(45+0.5 \text{ Latitude } E) - \ln\tan(45+0.5 \text{ Latitude } P))]/\text{pi}$, and memory means, and means for storing in the memory means reflected radar signals along with the latitude and longitude positions for the reflected radar signals.

13. A system as in claim 10 further including means for storing predetermined latitude and longitude data, wherein said display means includes means responsive to further display control signals for displaying latitude and longitude indicia indicating the location of weather images relative to latitude and longitude, and wherein said control means includes means for producing further display control signals from the stored digitized signals, horizontal deflection signals, range signals, heading signals, position signals, track signals and latitude and longitude data.

14. A weather radar/map display system for aircraft comprising means for transmitting radar signals from the aircraft and for receiving back reflected radar signals, means for digitizing the reflected radar signals received by the transmitting and receiving means, means for calculating the latitude and longitude coordinates of the locations in space from which the reflected radar signals were reflected, first means for storing the digitized signals and the latitude and longitude coordinates calculated for respective reflected radar signals, second means for storing predetermined map data, referenced to latitude and longitude, of the ground over which the aircraft will travel, and display means responsive to the first and second storing means for simultaneously displaying a plan view image over a selected horizontal range (a) of weather, represented by digitized reflected radar signals, relative to the calculated latitude and longitude coordinates, and (b) of the map data relative to the latitude and longitude of that data, said weather display and map data display being superimposed over one another.

* * * * *

UNITED STATES PATENT AND TRADEMARK OFFICE
CERTIFICATE OF CORRECTION

PATENT NO. : 5,202,690
DATED : April 13, 1993
INVENTOR(S) : Philip R. Frederick

It is certified that error appears in the above-identified patent and that said Letters Patent is hereby corrected as shown below:

column 8, line 29 of the patent, change "60" to --60*R--.

In Claim 12, column 14, line 25 of the patent, change "60" to --60*R--.

Signed and Sealed this

Sixth Day of August, 1996

Attest:

BRUCE LEHMAN

Attesting Officer    Commissioner of Patents and Trademarks